(12) United States Patent
Calixtro et al.

(10) Patent No.: US 12,065,945 B2
(45) Date of Patent: Aug. 20, 2024

(54) INTERNALLY COOLED TURBINE BLADE

(71) Applicant: RTX Corporation, Farmington, CT (US)

(72) Inventors: Carlos Calixtro, Atlanta, GA (US); Alex D. Wong, South Windsor, CT (US); Yanhu Guo, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/545,535

(22) Filed: Dec. 19, 2023

(65) Prior Publication Data

US 2024/0117742 A1 Apr. 11, 2024

Related U.S. Application Data

(62) Division of application No. 17/651,179, filed on Feb. 15, 2022, now Pat. No. 11,885,235.

(51) Int. Cl.
 *F01D 5/18* (2006.01)

(52) U.S. Cl.
 CPC ........ *F01D 5/186* (2013.01); *F05D 2220/323* (2013.01); *F05D 2240/30* (2013.01); *F05D 2240/303* (2013.01); *F05D 2240/304* (2013.01); *F05D 2250/185* (2013.01); *F05D 2260/202* (2013.01); *F05D 2260/22141* (2013.01)

(58) Field of Classification Search
 CPC .............. F01D 5/186; F05D 2250/185; F05D 2260/202; F05D 2260/22141
 See application file for complete search history.

(56) References Cited

U.S. PATENT DOCUMENTS

| | | | |
|---|---|---|---|
| 7,377,747 B2 * | 5/2008 | Lee ..................... | F01D 5/3007 |
| | | | 416/97 R |
| 9,376,921 B2 | 6/2016 | Papple et al. | |
| 9,518,469 B2 | 12/2016 | Tibbott et al. | |
| 10,626,729 B2 * | 4/2020 | Thomen ................. | F01D 5/187 |
| 10,641,106 B2 * | 5/2020 | Crites .................... | F01D 5/186 |
| 11,015,455 B2 | 5/2021 | Zhang et al. | |
| 2014/0086724 A1 | 3/2014 | Tibbott et al. | |
| 2016/0032730 A1 | 2/2016 | Thomen et al. | |
| 2019/0145266 A1 * | 5/2019 | Crites .................... | F01D 5/186 |
| | | | 416/95 |
| 2020/0378262 A1 * | 12/2020 | Crites .................... | F01D 5/186 |

* cited by examiner

*Primary Examiner* — Eldon T Brockman
(74) *Attorney, Agent, or Firm* — Kinney & Lange, P. A.

(57) ABSTRACT

An internally cooled turbine blade for use in a gas turbine engine includes a serpentine channel extending within the turbine blade for flowing cooling air through the interior of the blade. The turbine blade includes turbulators positioned within the serpentine channel to cause or increase turbulence of the cooling air flowing through the serpentine channel, increasing the heat transfer between the turbine blade and the cooling air before exiting a plurality of air outlets within the turbine blade.

13 Claims, 5 Drawing Sheets

INTERNALLY COOLED TURBINE BLADE

CROSS-REFERENCE TO RELATED APPLICATION(S)

This application is a divisional of U.S. application Ser. No. 17/651,179 filed Feb. 15, 2022 for "INTERNALLY COOLED TURBINE BLADE" is hereby incorporated by reference in their entirety.

BACKGROUND

The present invention relates to turbine blades for use in gas turbine engines and, more particularly, to cooling the turbine blade by flowing cooling air through the turbine blade.

A gas turbine engine typically includes a fan section, a compressor section, a combustor section, and a turbine section. Air entering the compressor section is compressed and delivered into the combustion section where it is mixed with fuel and ignited to generate a high-energy gas flow. The high-energy gas flow expands through the turbine section to drive the compressor and the fan section. The compressor section typically includes low-pressure and high-pressure compressors, and the turbine section typically includes low-pressure and high-pressure turbines. Both the compressor and turbine sections include rotating blades alternating between stationary vanes. The stationary vanes and rotating blades in the turbine section extend into the flow path of the high-energy gas flow. As such, the vanes and rotating blades within the gas flow path are exposed to extreme temperatures. A cooling air flow is therefore utilized to cool the turbine blades, improving durability and performance of the turbine blades and preventing damage or deformation to the turbine blade.

SUMMARY

According to one aspect of the disclosure, an internally cooled turbine blade for use in a gas turbine engine is disclosed. The internally cooled turbine blade includes an airfoil with a concave sidewall and a convex sidewall extending spanwise between a platform and a blade tip, and chordwise between a leading edge and a trailing edge. The internal surfaces of the airfoil define an internal cooling passage within the airfoil extending between a cooling air inlet and a plurality of air outlets. The internal cooling passage includes a serpentine channel comprising a leading edge channel, an intermediate channel, a trailing edge channel, and a plurality of turbulators. Two adjacent rows of the plurality of turbulators are positioned within the trailing edge channel.

According to another aspect of the disclosure, a turbine blade for use in a gas turbine engine is disclosed. The turbine blade includes an airfoil with a concave sidewall and a convex sidewall extending spanwise between a platform and a blade tip, and chordwise between a leading edge and a trailing edge. Internal surfaces of the airfoil define an internal cooling passage within the airfoil extending between a cooling air inlet and a plurality of air outlets. The internal cooling passage includes a serpentine channel comprising a leading edge channel, an intermediate channel, a trailing edge channel, a plurality of turbulators positioned along an internal surface of a sidewall, and a plurality of leading edge turbulators positioned along a leading edge of the leading edge channel. The plurality of turbulators extend from a first pull plane into the serpentine channel, and at least a portion of the plurality of leading edge turbulators extend from a second pull plane into the serpentine channel. The second pull plane is offset from the first pull plane by a compound angle comprising a first angle and a second angle.

According to yet another aspect of the disclosure, an internally cooled turbine blade for use in a gas turbine engine is disclosed. The internally cooled turbine blade includes an airfoil with a concave sidewall and a convex sidewall extending spanwise between a platform and a blade tip, and chordwise between a leading edge and a trailing edge. The internal surfaces of the airfoil define an internal cooling passage within the airfoil extending between a cooling air inlet and a plurality of air outlets. The internal cooling passage includes a serpentine channel comprising a leading edge channel, an intermediate channel, a trailing edge channel, and a plurality of turbulators. The cooling air inlet comprises a first inlet, a second inlet, a third inlet, and a fourth inlet. The first inlet and the second inlet combine into a first combined inlet, the third inlet and the fourth inlet combine into a second combined inlet, the first combined inlet is in fluid communication with the leading edge channel, and the second combined inlet is in fluid communication with the trailing edge channel.

DETAILED DESCRIPTION

Figure 1:
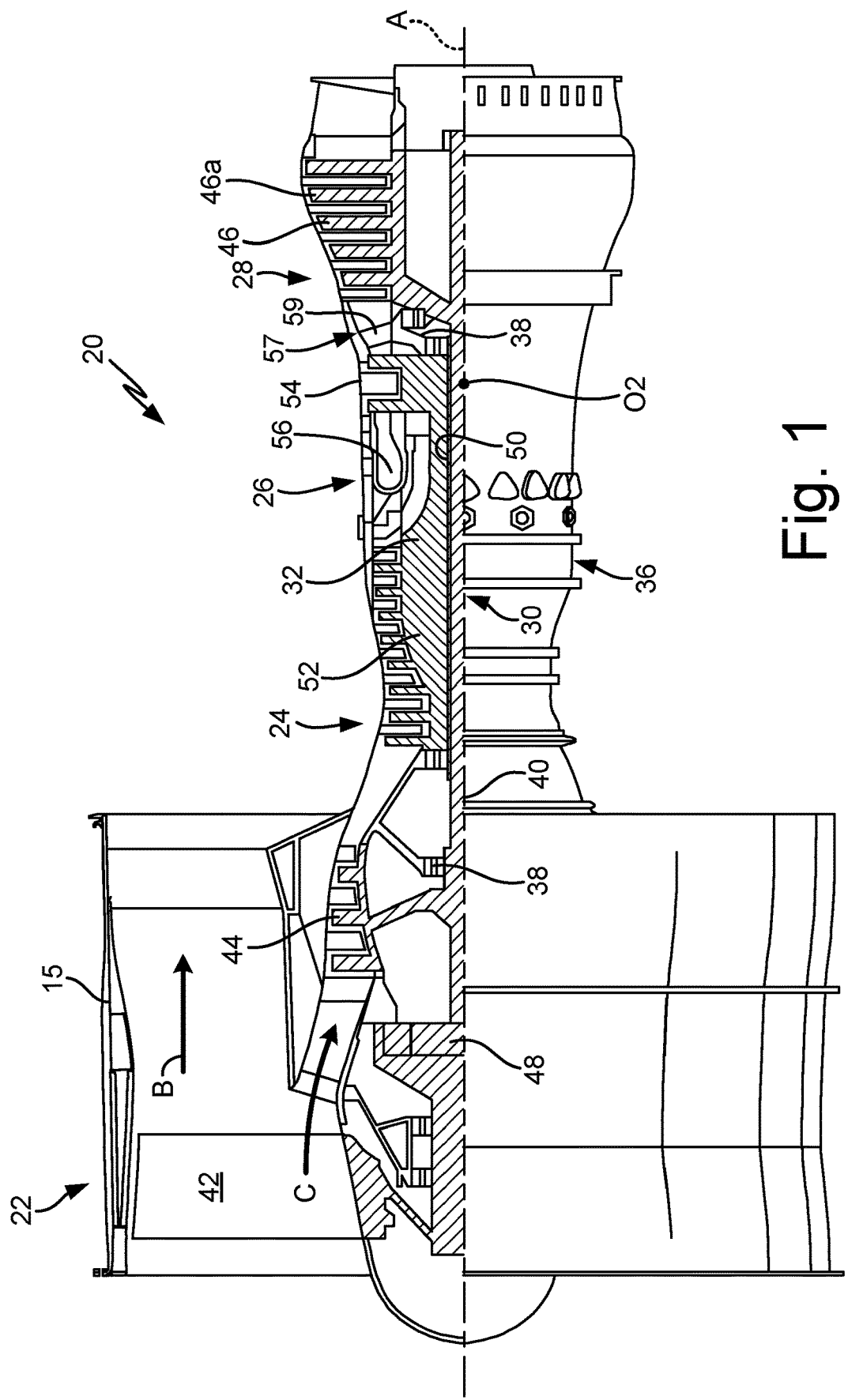
FIG. 1 is an axial cross-sectional view of an exemplary gas turbine engine.
Figure 2:
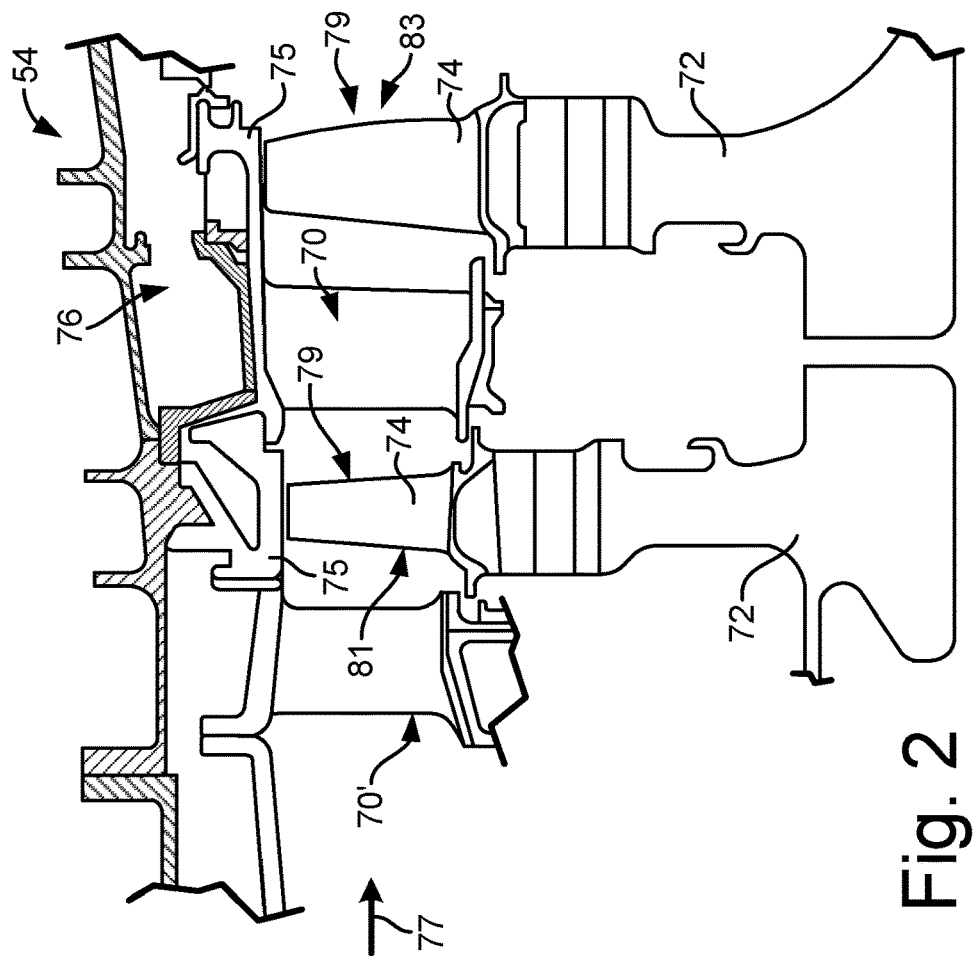
FIG. 2 is a schematic view of a two-stage high pressure turbine of the gas turbine engine.

FIG. 1 is an axial cross-sectional view of an exemplary gas turbine engine 20. FIG. 2 is a schematic view of a two-stage high pressure turbine of gas turbine engine 20. FIGS. 1-2 will be discussed together. Gas turbine engine 20 is disclosed herein as a two-spool turbofan that generally incorporates a fan section 22, a compressor section 24, a combustor section 26, and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low-speed spool 30 and a high-speed spool 32 mounted for rotation about an engine central longitudinal axis A (engine centerline) relative to an engine static structure 36 via several bearing systems 38. It should be understood that various bearing systems 38 at various locations may alternatively or additionally be provided, and the location of bearing systems 38 may be varied as appropriate to the application.

The low-speed spool 30 generally includes an inner shaft 40 that interconnects a fan 42, a first or low-pressure compressor 44 and a first or low-pressure turbine 46. The inner shaft 40 is connected to the fan 42 through a speed change mechanism, which in exemplary gas turbine engine 20 is illustrated as a geared architecture 48 to drive the fan 42 at a lower speed than the low-speed spool 30. The high-speed spool 32 includes an outer shaft 50 that interconnects a second or high-pressure compressor 52 and a second or high-pressure turbine 54. A combustor 56 is arranged in exemplary gas turbine 20 between the high-pressure compressor 52 and the high-pressure turbine 54. A mid-turbine frame 57 of the engine static structure 36 is arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A (engine centerline) which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 57 includes airfoils 59 which are in the core airflow path C. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Turbine components in a gas turbine engine often require active cooling as temperatures in the gas path exceed the melting point of the constituent components. However, as work is required to pressurize coolant flow prior to being used to cool components, the result of adding cooling flow decreases the efficiency of the turbine. Thus, when designing turbine components, flow must be used sparingly to meet part and module life targets without reducing gas turbine engine performance targets to unacceptable levels.

FIG. 2 illustrates a portion of the high-pressure turbine (HPT) 54. FIG. 2 also illustrates high-pressure turbine stage vanes 70 one of which (e.g., first stage vane 70') is located forward of a first one of a pair of turbine disks 72 each having a plurality of turbine blades 74 secured thereto. Turbine blades 74 rotate proximate blade outer air seals (BOAS) 75 which are located aft of vane 70 or first stage vane 70'. The other vane 70 is located between the pair of turbine disks 72, this vane 70 may be referred to as the second stage vane. As used herein first stage vane 70' is the first vane of high-pressure turbine section 54 that is located aft of combustor section 26 and second stage vane 70 is located aft of first stage vane 70' and is located between the pair of turbine disks 72. In addition, blade outer air seals (BOAS) 75 are disposed between first stage vane 70' and second stage vane 70. The high-pressure turbine stage vane 70 (e.g., second stage vane) is one of a plurality of vanes 70 that are positioned circumferentially about the axis A (engine centerline) of the engine in order to provide stator assembly 76. Hot gases from combustor section 26 flow through the turbines in the direction of arrow 77. Although a two-stage high pressure turbine is illustrated, other high-pressure turbines are considered to be within the scope of various embodiments of the present disclosure.

High-pressure turbine (HPT) 54 is subjected to gas temperatures well above the yield capability of its material. In order to mitigate detrimental effects due to such high temperature, surface film-cooling and internal cooling are typically used to cool the blades and vanes of the high-pressure turbine. Surface film-cooling is achieved by supplying cooling air from the relatively cold (compared to the temperature of the gas temperatures) interior or backside of the turbine blade through cooling holes formed on the high-pressure turbine components. Cooling holes are strategically designed and placed on the vane and turbine components in-order to maximize the cooling effectiveness and minimize the efficiency penalty.

Turbine blade 74 illustrated in FIG. 2 includes cooling holes for producing the desired surface film-cooling. As discussed, turbine blades 74 are secured to turbine disk 72 that is configured to rotate about axis A (engine centerline). Turbine disk 72 and its attached turbine blades 74 may be referred to as turbine rotor assembly 79. Turbine blades 74 and their associated disks 72 are located behind or downstream from first stage vane 70' and the second stage vane 70. The turbine blades located behind or downstream from first stage vane 70' and in front of second stage vane 70 may be referred to as first stage turbine blades 81. The turbine blades located behind or downstream from second stage vane 70 may be referred to as second stage turbine blades 83. The following discussion regarding turbine blade 74 should be understood to apply equally to both first stage turbine blades 81 and second stage turbine blade 83.

Figure 3A:
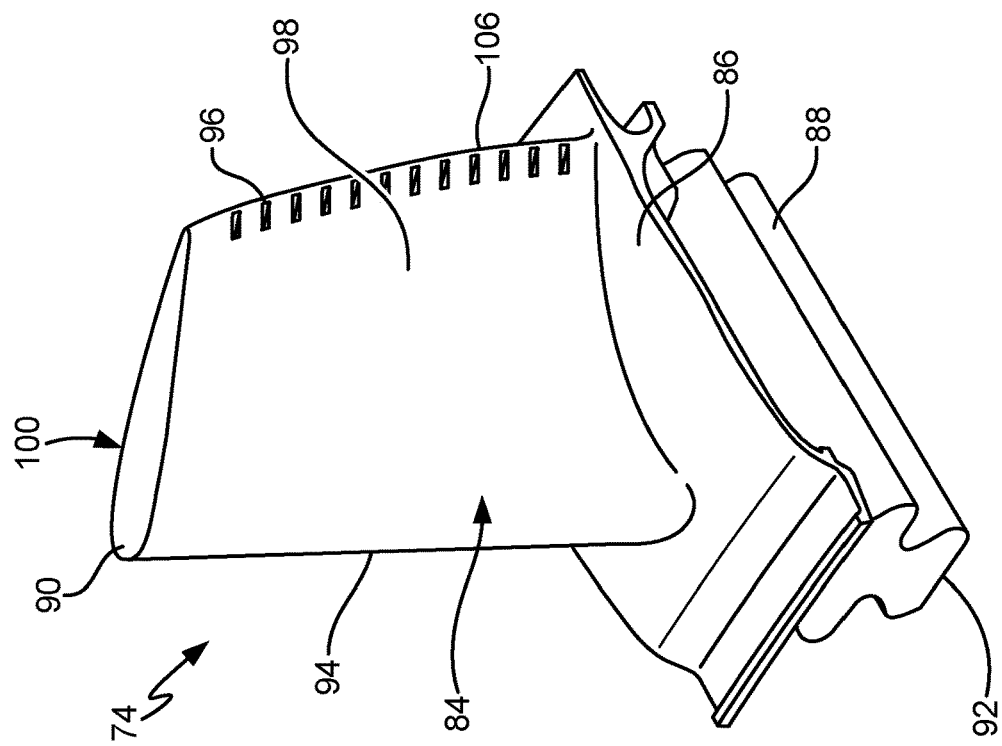
FIG. 3A is a perspective view of a turbine blade used within the gas turbine engine.
Figure 3B:
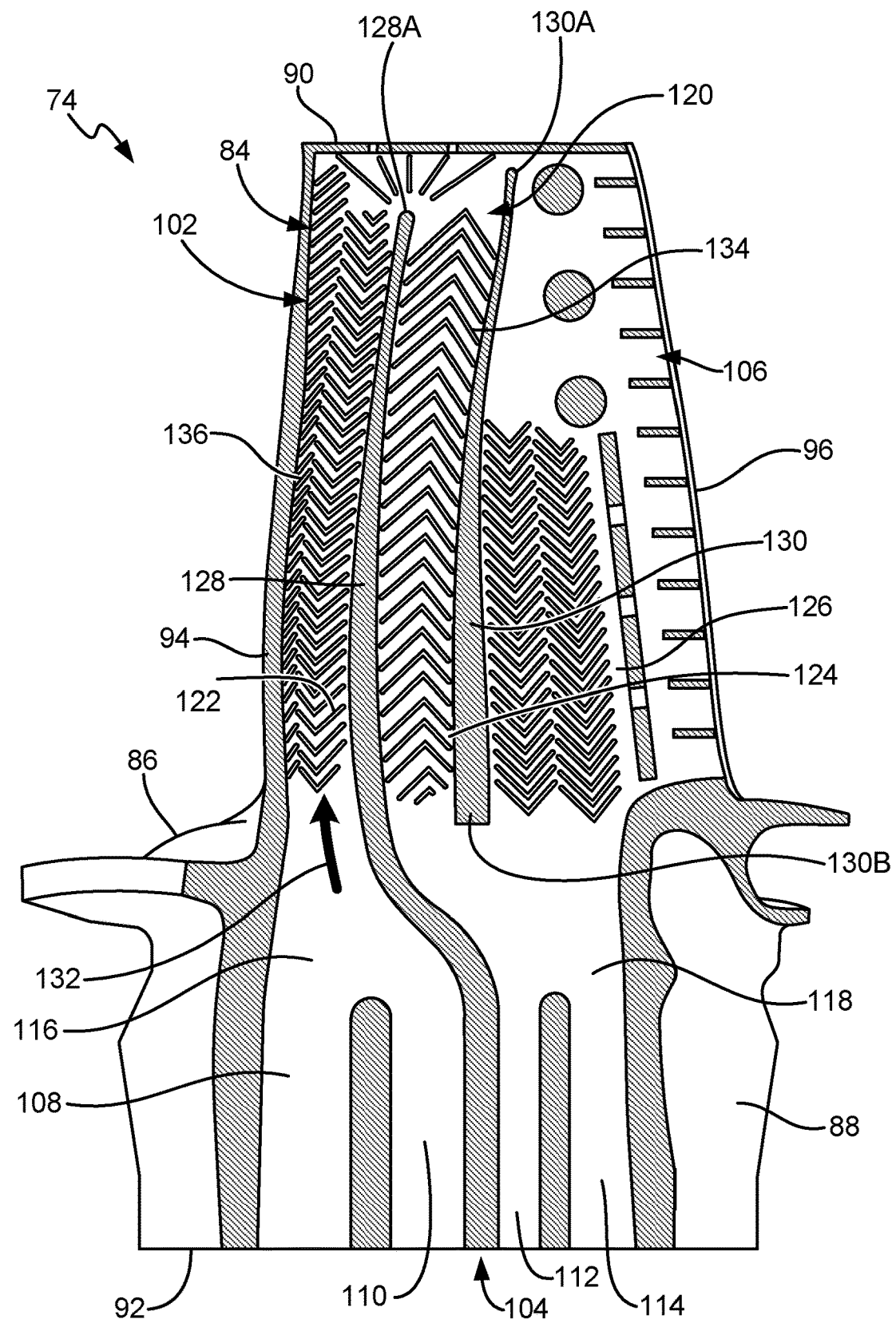
FIG. 3B is a side cross-sectional view of the turbine blade of FIG. 3A.
Figure 3C:
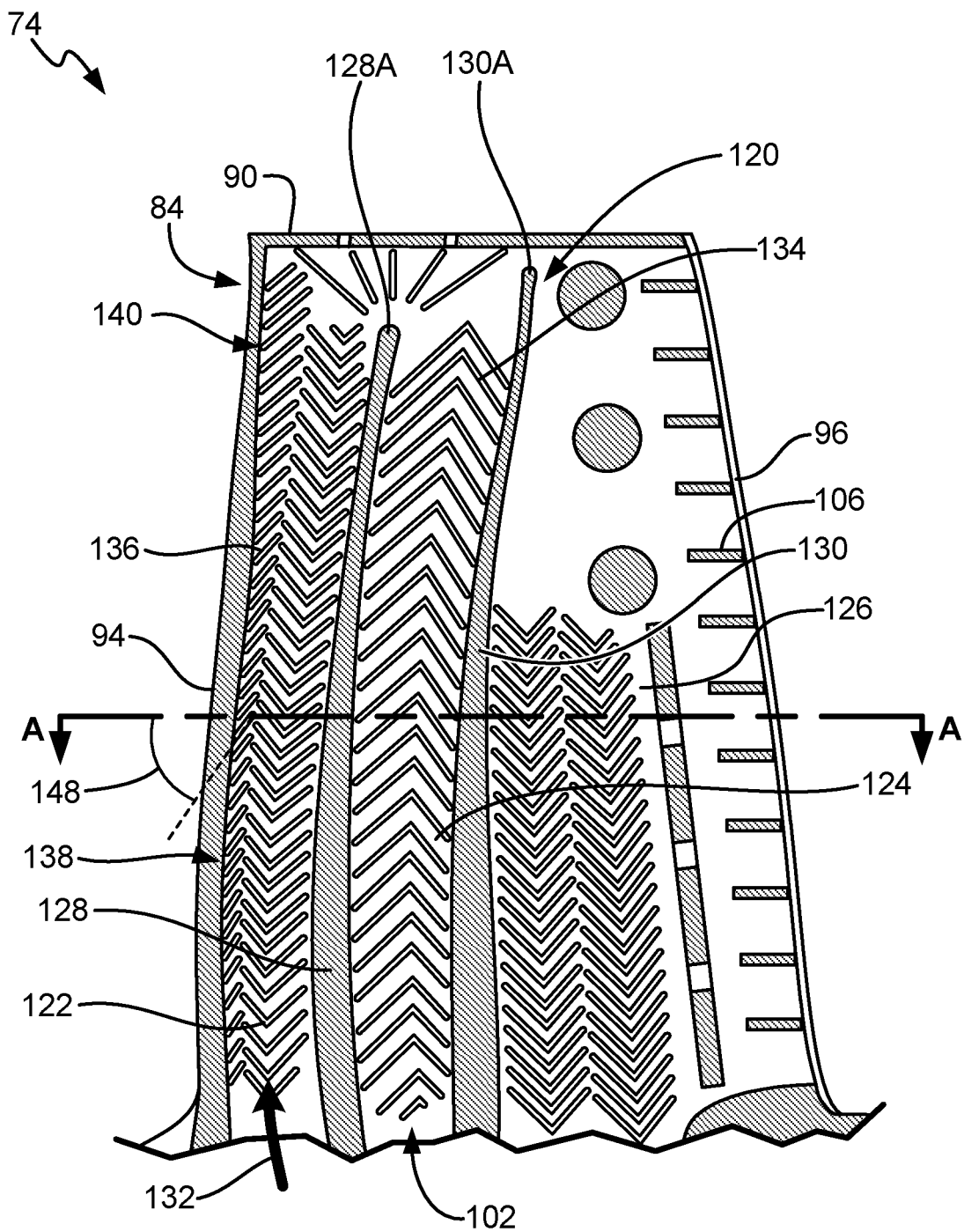
FIG. 3C is a closeup side cross-sectional view of a portion of the turbine blade of FIG. 3B.

FIG. 3A is a perspective view of turbine blade 74 used within gas turbine engine 20. FIG. 3B is a side cross-sectional view of turbine blade 74. FIG. 3C is a closeup side cross-sectional view of a portion of turbine blade 74. FIGS. 3A-3C will be discussed together. As shown best in FIG. 3A, turbine blade 74 includes airfoil 84, platform 86, and root 88. Airfoil 84 is coupled to platform 86 at one end and airfoil 84 includes blade tip 90 that terminates at the other end of airfoil 84, opposite platform 86. Airfoil 84 extends radially outward from platform 86, with respect to axis A (FIG. 1), such that blade tip 90 of airfoil 84 is at a further radial distance from axis A than platform 86. Root 88 is coupled to platform 86 and root 88 extends radially inward from platform 86, with respect to axis A, such that root 88 is at a closer radial distance to axis A than platform 86. Root 88 is used to secure turbine blade 74 to turbine disk 72. Root 88 includes base 92, which is the innermost surface of root 88 and turbine blade 74. In other words, base 92 is a surface of root 88 that is positioned closer to axis A than any other feature of turbine blade 74. In contrast, blade tip 90 of airfoil 84 is positioned farther from axis A than any other feature of turbine blade 74. In one embodiment, airfoil 84 may be integrally formed or cast with platform 86 and/or root 88. In other words, turbine blade 74 including airfoil 84, platform 86, and root 88 may be cast as a single part.

Airfoil 84 includes leading edge 94, trailing edge 96, concave sidewall 98, convex sidewall 100, and internal cavities that are in fluid communication with a source of cooling air or fluid. Leading edge 94 is the forward or upstream edge of turbine blade 74, with respect to the flow direction through engine 20. Trailing edge 96 is the rear or downstream edge of turbine blade 74, with respect to the flow direction through engine 20. Concave sidewall 98 and convex sidewall 100 each extend chordwise between leading edge 94 and trailing edge 96 and spanwise between platform 86 and blade tip 90. It is to be understood that concave sidewall 98 can also be referred to as the pressure-side sidewall and convex sidewall 100 can also be referred to as the suction-side sidewall. In some examples, airfoil 84 also includes a plurality of cooling openings or film cooling holes that are in fluid communication with the internal cavities in order to provide a source of cooling fluid or air to portions of airfoil 84, such that film cooling can be provided at desired locations.

Referring now to FIG. 3B, turbine blade 74 includes internal cooling passage 102 extending between cooling air inlet 104 and air outlets 106. Cooling air inlet 104 is positioned adjacent and extends though base 92 of root 88. More specifically, cooling air inlet 104 includes first inlet 108, second inlet 110, third inlet 112, and fourth inlet 114, each positioned adjacent and extending though base 92 of root 88. As shown, first inlet 108 and second inlet 110 combine into first combined inlet 116, and third inlet 112 and fourth inlet 114 combine into second combined inlet 118. Inlets 108, 110, 112, and 114 are fluidly coupled to a cooling air source (not shown) positioned within gas turbine engine 20. Each inlet (108, 110, 112, and 114) is configured to receive cooling air from the cooling source and flow the cooling air into and through internal cooling passage 102 within turbine blade 74.

More specifically, the cooling air flowing through first inlet 108 and second inlet 110 combine into a single stream of flowing cooling air within first combined inlet 116 and then the stream of cooling air flows through internal cooling passage 102. Likewise, the cooling air flowing through third inlet 112 and fourth inlet 114 combine into a single stream of flowing cooling air within second combined inlet 118 and then the stream of cooling air flows through internal cooling passage 102. The cooling air that flows through internal cooling passage 102 exits through a plurality of air outlets 106. In the embodiment shown, the plurality of air outlets 106 are positioned adjacent trailing edge 96, extending approximately from platform 86 to approximately blade tip 90. Further, the plurality of air outlets 106 extend through airfoil 84 to internal cooling passage 102, such that the plurality of air outlets 106 are in fluid communication with internal cooling passage 102 adjacent trailing edge 96. In another embodiment, air outlets 106 can be positioned anywhere within airfoil 84, as long as air outlets 106 are in fluid communication with internal cooling passage 102.

In the embodiment shown in FIG. 3B, each of first inlet 108, second inlet 110, third inlet 112, and fourth inlet 114 have differing cross-sectional flow areas (and volumes) to meter the flow of cooling air through the inlets 108, 110, 112, 114. More specifically, both first inlet 108 and second inlet 110 have a larger cross-sectional flow area (and volume) than both third inlet 112 and fourth inlet 114. First inlet 108 has a larger cross-sectional flow area (and volume) than second inlet 110, such that first inlet 108 has the largest cross-sectional flow area (and volume) out of each inlet. Second inlet 110 has a larger cross-sectional flow area (and volume) than fourth inlet 114, such that second inlet 110 has the second largest cross-sectional flow area (and volume) out of each inlet. Fourth inlet 114 has a larger cross-sectional flow area (and volume) than third inlet 112, resulting in third inlet 112 having the smallest cross-sectional flow area (and volume) out of each inlet. Although the cross-sectional flow areas (and volumes) of inlets 108, 110, 112, and 114 are described in this specific embodiment, it is to be understood that the cross-sectional flow areas (and volumes) of each inlet 108, 110, 112, and 114 can vary in other embodiments and the disclosure is not limited in any way to the specific embodiment shown in FIG. 3B.

Referring to FIGS. 3B and 3C, internal cooling passage 102 includes serpentine channel 120 winding back and forth between platform 86 and blade tip 90. In other words, internal cooling passage 102 is a serpentine channel 120 that extends from platform 86 towards blade tip 90, then turns and extends from blade tip 90 towards platform 86, and then turns again and extends from platform 86 towards blade tip 90. As such, serpentine channel 120 includes leading edge channel 122, intermediate channel 124, and trailing edge channel 126. Leading edge channel 122 is positioned within airfoil 84, adjacent leading edge 94 of airfoil 84, and extending between platform 86 and blade tip 90. Trailing edge channel 126 is positioned within airfoil 84, adjacent trailing edge 96 of airfoil 84, and extending between platform 86 and blade tip 90. Intermediate channel 124 is positioned between leading edge channel 122 and trailing edge channel 126, and intermediate channel 124 extends between platform 86 and blade tip 90.

Further, leading edge channel 122 and intermediate channel 124 are separated by first dividing wall 128, and trailing edge channel 126 and intermediate channel 124 are separated by second dividing wall 130. First dividing wall 128 and second dividing wall 130 are walls or structures that extend between and connect concave sidewall 98 to convex sidewall 100. More specifically, first dividing wall 128 extends from platform 86 towards blade tip 90 but does not extend all the way up to blade tip 90. Likewise, second dividing wall 130 extends from platform 86 towards blade tip 90 but does not extend all the way up to blade tip 90. Further, second radially outer end 130A of second dividing wall 130 is positioned closer to blade tip 90 than first radially outer end 128A of first dividing wall 128. In other words, first radially outer end 128A of first dividing wall 128 is positioned radially closer to center longitudinal axis A (FIG. 1) than second radially outer end 130A of second dividing wall 130.

First dividing wall 128 and second dividing wall 130 gradually decrease in thickness or width as each extends toward blade tip 90, such that portions of first dividing wall 128 and second dividing wall 130 closer to root 88 are thicker (or wider in the view shown in FIGS. 3B and 3C) than portions of first dividing wall 128 and second dividing wall 130 closer to blade tip 90. The thickness of first dividing wall 128 and second dividing wall 130 gradually decreases to minimize the weight of turbine blade 74 while maintaining sufficient strength and stiffness characteristics. A turbine blade having too thick of first dividing wall 128 and second dividing wall 130 could induce undesirable stresses on turbine blade 74. Dividing walls 128 and 130 are configured to guide the cooling air flowing through serpentine channel 120 to the plurality of air outlets 106.

More specifically, the cooling air flowing through first inlet 108 and second inlet 110 combine in first combined inlet 116. The cooling air flows in flow direction 132 into leading edge channel 122 from platform 86 towards blade tip 90. The cooling air then turns the corner around first radially outer end 128A of first dividing wall 128 and flows within intermediate channel 124 towards platform 86. The cooling air continues by flowing around second radially inner end 130B (FIG. 3B) of second dividing wall 130 and flows towards blade tip 90. In addition, cooling air flowing through third inlet 112 and fourth inlet 114 combine in second combined inlet 118 and then continues to flow into trailing edge channel 126. The cooling air flowing from second combined inlet 118 mixes with the cooling air flowing from first combined inlet 116, which flows through leading edge channel 122 and intermediate channel 124. Then the mixed cooling air flows towards blade tip 90 and exits through the plurality of air outlets 106 positioned adjacent trailing edge 96 of airfoil 84. As such, dividing walls 128 and 130 guide cooling air from cooling air inlet 104, through each of leading edge channel 122, intermediate channel 124, and trailing edge channel 126, and to the plurality of air outlets 106. The cooling air flowing through turbine blade 74 is configured to cool turbine blade 74 during use of gas turbine engine 20 to prevent heat related damages to turbine blade 94 during operation of gas turbine engine 20.

To increase the cooling characteristics of turbine blade 74, a plurality of turbulators 134 can be positioned within serpentine channel 120. More specifically, a plurality of turbulators 134 can be positioned within each of leading edge channel 122, intermediate channel 124, and trailing edge channel 126. Turbulators 134 can also be referred to as trip strips, and turbulators 134 are configured to increase the turbulence of the cooling air flowing through serpentine channel 120. Increasing the turbulence of the cooling air increases the heat transfer rate between turbine blade 74 and the cooling air flowing within turbine blade 74. As such, turbulators 134 aid in preventing heat related damages to turbine blade 74 during operation of gas turbine engine 20.

Each of the plurality of turbulators 134 can be raised portions extending from the interior walls of serpentine channel 120 into each of leading edge channel 122, intermediate channel 124, and trailing edge channel 126. As such, cooling air flowing through channels 122, 124, and 126 interfaces with the plurality of turbulators 134 causing unsteady mixing and movement of the cooling air as it travels through serpentine channel 120. In the example shown, each of the plurality of turbulators 134 have a chevron shape, such that each of the plurality of turbulators 134 are generally "V" shaped. Each of the plurality of chevron shaped turbulators 134 has a point that is aimed in an opposite direction as the cooling air flowing through each of channels 122, 124, and 126. Although the plurality of turbulators 134 are described as having a chevron shape, it is to be understood that this is a nonlimiting example and the plurality of turbulators 134 can have various other shapes to achieve the desired cooling air turbulence within turbine blade 74.

As shown best in FIG. 3C, in the embodiment shown, leading edge channel 122 includes a single row of the plurality of turbulators 134 positioned within leading edge channel 122, such that the plurality of turbulators 134 extend from a bottom to a top of leading edge channel 122. Likewise, intermediate channel 124 includes a single row of the plurality of turbulators 134 positioned within intermediate channel 124, such that the plurality of turbulators 134 extend from a top to a bottom of intermediate channel 124. Trailing edge channel 126 includes two adjacent rows of the plurality of turbulators 134, such that the plurality of turbulators 134 extend from a bottom towards a top of trailing edge channel 126. The two adjacent rows of the plurality of turbulators 134 extend side by side in a parallel orientation in a direction towards blade tip 90. In the embodiment shown in FIG. 3C, the two adjacent rows of the plurality of turbulators 134 positioned within trailing edge channel 126 extend only a partial distance up trailing edge channel 126. In another embodiment, the two adjacent rows of the plurality of turbulators 134 positioned within trailing edge channel 126 can extend a full distance up trailing edge channel 126. In one example, a first row of the plurality of turbulators 134 positioned within trailing edge channel 126 extends at least 75% a distance from platform 86 towards blade tip 90, and a second row of the plurality of turbulators 134 positioned within trailing edge channel 126 extends at least 50% the distance from platform 86 towards blade tip 90.

Referring again to FIG. 3C, turbine blade 74 can include a plurality of leading edge turbulators 136 positioned along an internal surface of leading edge 94 of leading edge channel 122. Leading edge turbulators 136 are similar to and serve the same purpose as turbulators 134, which is to increase the turbulence of the cooling air flowing through leading edge channel 122. Further, each of the plurality of leading edge turbulators 136 can have a chevron shape, such that each of the plurality of leading edge turbulators 136 have a "V" shape. Each of the plurality of chevron shaped leading edge turbulators 136 has a point that is aimed in an opposite direction as the cooling air flowing through leading edge channel 122, such that each of the points are aimed toward platform 86. The plurality of leading edge turbulators 136 includes first section 138 of leading edge turbulators 136 and second section 140 of leading edge turbulators 136.

First section 138 of leading edge turbulators 136 includes a portion of leading edge turbulators 136 that extend up leading edge 94 of airfoil 84 from platform 86 towards blade tip 90. Second section 140 of leading edge turbulators 136 includes a portion of leading edge turbulators 136 that extend up leading edge 94 of airfoil 84 from an end of first section 138 of leading edge turbulators 136 towards blade tip 90 of turbine blade 74. In one example, first section 138 of leading edge turbulators 136 extends up leading edge 94 of airfoil 84 and ends between 70% and 90% a distance from base 92 and blade tip 90 of turbine blade 74. In other examples, first section 138 of leading edge turbulators 136 can extend up leading edge 94 of airfoil 84 and end at a distance greater than 90% or less than 70% the distance from base 92 and blade tip 90 of turbine blade 74. First section 138 and second section 140 of leading edge turbulators 136 are both configured to induce turbulence of the cooling air flowing through leading edge channel 122 to increase the heat transfer rate between turbine blade 74 and the cooling air.

Figure 4:
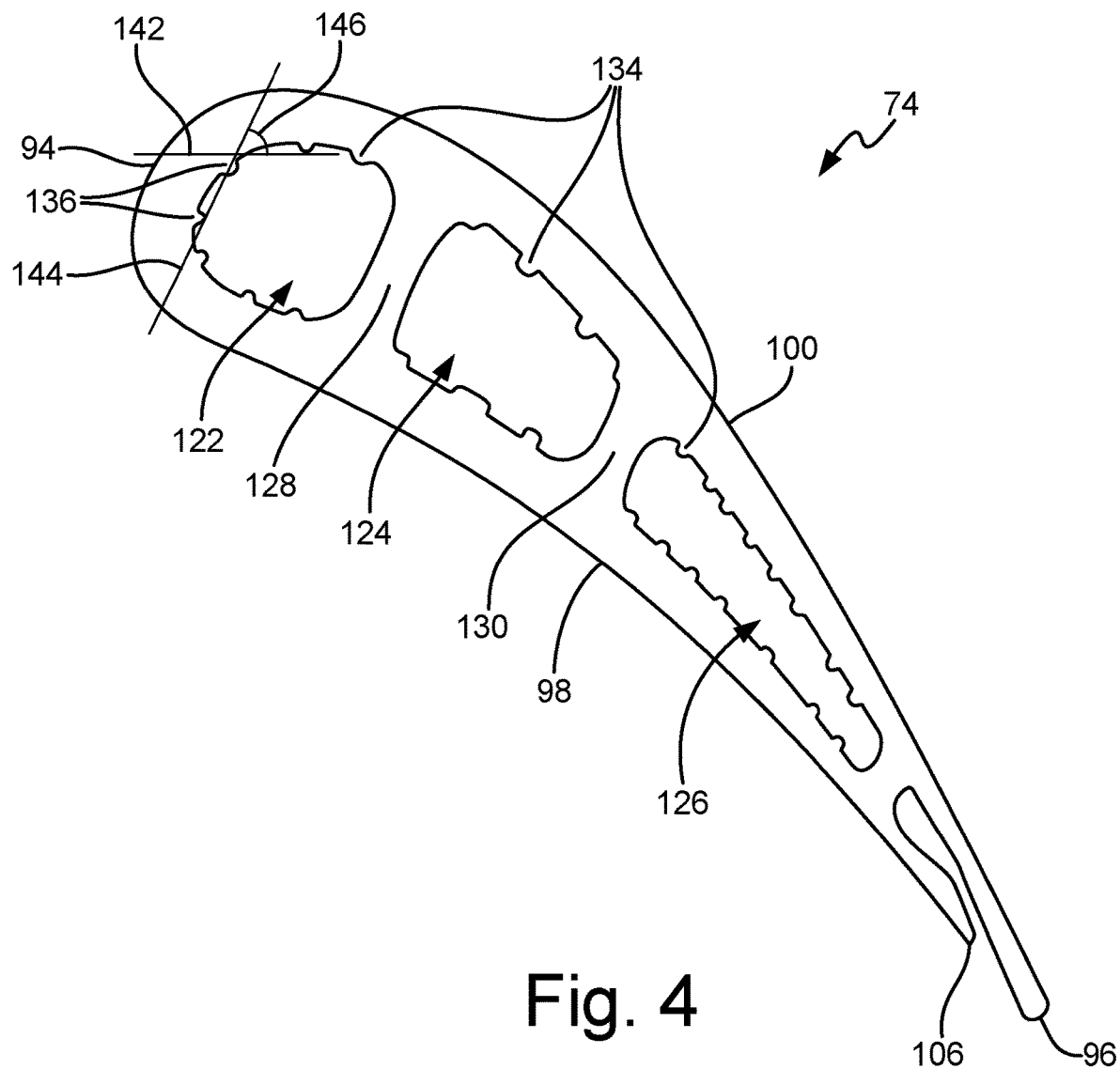
FIG. 4 is a cross-sectional view taken along Section A-A of FIG. 3C.

FIG. 4 is a cross-sectional view taken along Section A-A of FIG. 3C. Further, FIG. 4 shows turbine blade 74 including leading edge 94, trailing edge 96, concave sidewall 98, convex sidewall 100, leading edge channel 122, intermediate channel 124, trailing edge channel 126, first dividing wall 128, second dividing wall 130, turbulators 134, and leading edge turbulators 136. FIG. 4 also shows first pull plane 144, second pull plane 142, and first angle 146. As shown, turbulators 134 and leading edge turbulators 136 extend from a pull plane into serpentine channel 120. As such, turbulators 134 and leading edge turbulators 136 extend into serpentine channel 120, creating raised surfaces within serpentine channel 120 that create turbulence of cooling air flowing through serpentine channel 120. Turbulators 134 includes all turbulators within turbine blade 74 except first section 138 (FIG. 3C) of leading edge turbulators 136, such that turbulators 134 includes second section 140 of leading edge turbulators 136.

Turbulators 134 are positioned such that each of turbulators 134 extend along first pull plane 144 into serpentine channel 120. More specifically, during manufacturing of turbine blade 74, each of turbulators 134 are pulled (or extracted) along first pull plane 144, including second section 140 of leading edge turbulators 136. The specific angle/orientation of first pull plane 144 is strategically chosen to produce turbulators 134 having a desired shape and size to create sufficient turbulence of the cooling air flowing through serpentine channel 120, but due to the curvature of turbine blade 74 each turbulator 134 may not be oriented at the same angle. Likewise, first section 138 of leading edge turbulators 136 are positioned such that each of leading edge turbulators 136 within first section 138 of leading edge turbulators 136 extend from second pull plane 142 into serpentine channel 120. More specifically, during manufacturing of turbine blade 74, each of the turbulators within first section 138 of leading edge turbulators 136 are pulled (or extracted) along second pull plane 142. The specific angle/orientation of second pull plane 144 is strategically chosen to produce leading edge turbulators 136 having a desired shape and size to create sufficient turbulence of the cooling air flowing through serpentine channel 120. As such, first section 138 of leading edge turbulators 136 are pulled from second pull plane 142 and second section 140 of leading edge turbulators 136 are pulled from first pull plane 144, resulting in portions of leading edge turbulators 136 being pulled from differing planes.

As shown in FIGS. 3C and 4, first pull plane 144 is oriented at a different angle than second pull plane 142. More specifically, second pull plane 142 is offset from first pull plane 144 by a compound angle including first angle 146 and second angle 148 (FIG. 3C). Referring to FIG. 4, first angle 146 is rotated about an axis by an angle between 45 degrees and 85 degrees, and in some exemplary embodiments by an angle between 55 degrees and 75 degrees. Referring to FIG. 3C second angle 148 is rotated about an axis towards root 88 by an angle between 20 degrees and 60 degrees, and in some exemplary embodiments by an angle between 30 degrees and 50 degrees. As such, the compound angle includes rotating first pull plane 144 by first angle 146 and second angle 148. In other words, second pull plane 142 is offset from first pull plane 144 by first angle 146 and second angle 148. This results in first section 138 of leading edge turbulators 136 being pulled from a different orientation than turbulators 134 to produce turbulators within turbine blade 74 that have the desired shape and size to create sufficient turbulence within serpentine channel 120.

If first section 138 of leading edge turbulators 136 were pulled from first pull plane 144, it would result in the shape and size of first section 138 of leading edge turbulators 136 being undesirable causing insufficient cooling air turbulence near leading edge 94 of turbine blade 74. Therefore, second pull plane 142 being offset from first pull plane 144 by the compound angle is advantageous because it creates turbulators having a size and shape that creates sufficient cooling air turbulence within turbine blade 74. In turn, having sufficient cooling air turbulence adjacent leading edge 94 allows for the removal of leading edge cooling holes because the cooling air turbulence adjacent leading edge 94 cools leading edge 94 of turbine blade 74 enough that turbine blade 74 can operate within a gas turbine engine without being damaged by the extreme operating temperatures. As such, turbulators 134, first section 138 of leading edge turbulators 136, and second section 140 of leading edge turbulators 136 are utilized to cool turbine blade 74, improving durability and performance of turbine blade 74 and preventing damage or deformation to turbine blade 74 during operation of gas turbine engine 20.

Turbine blade 74 including cooling air inlet 104 (including first inlet 108, second inlet 110, third inlet 112, fourth inlet 114, first combined inlet 116, and second combined inlet 118), serpentine channel 120 (including leading edge channel 122, intermediate channel 124, and trailing edge channel 126), turbulators 134 (including two adjacent rows of the plurality of turbulators 134 positioned within trailing edge channel 126), and leading edge turbulators 136 (including first section 138 and second section 140) is advantageous as compared to previous internally cooled turbine blades because the airflow within turbine blade 74 is optimized to increase the cooling capabilities of turbine blade 74. More specifically, the shape, location, and number of turbulators 138 are specifically designed to increase the turbulence of the cooling air flowing through turbine blade 74 to increase the cooling effectiveness of turbine blade 74. In turn, this improves the durability and performance of turbine blade 74 and prevents damage or deformation to turbine blade 74 during operation of gas turbine engine 20.

Discussion of Possible Embodiments

The following are non-exclusive descriptions of possible embodiments of the present invention.

An internally cooled turbine blade for use in a gas turbine engine, the internally cooled turbine blade comprising: an airfoil with a concave sidewall and a convex sidewall extending spanwise between a platform and a blade tip, and chordwise between a leading edge and a trailing edge; wherein internal surfaces of the airfoil define an internal cooling passage within the airfoil extending between a cooling air inlet and a plurality of air outlets, the internal cooling passage comprising: a serpentine channel comprising a leading edge channel, an intermediate channel, a trailing edge channel, and a plurality of turbulators; wherein two adjacent rows of the plurality of turbulators are positioned within the trailing edge channel.

The internally cooled turbine blade of the preceding paragraph can optionally include, additionally and/or alternatively, any one or more of the following features, configurations and/or additional components:

The leading edge channel is positioned adjacent the leading edge of the airfoil; the trailing edge channel is positioned adjacent the trailing edge of the airfoil; and the intermediate channel is positioned between the leading edge channel and the trailing edge channel.

The leading edge channel and the intermediate channel are separated by a first dividing wall, and wherein the trailing edge channel and the intermediate channel are separated by a second dividing wall.

A radially outer end of the second dividing wall is positioned closer to the blade tip than a radially outer end of the first dividing wall.

A single row of the plurality of turbulators are positioned within the leading edge channel and the intermediate channel.

The turbulators have a chevron shape, and wherein a point of each of the plurality of chevron shaped turbulators points in a direction opposite the flow direction of cooling air flowing through the internal cooling passage.

A first row of the plurality of turbulators positioned within the trailing edge channel extends at least 75% a distance from the platform towards the blade tip; and a second row of the plurality of turbulators positioned within the trailing edge channel extends at least 50% the distance from the platform towards the blade tip.

The following are further non-exclusive descriptions of possible embodiments of the present invention.

A turbine blade for use in a gas turbine engine, the turbine blade comprising: an airfoil with a concave sidewall and a convex sidewall extending spanwise between a platform and a blade tip, and chordwise between a leading edge and a trailing edge; wherein internal surfaces of the airfoil define an internal cooling passage within the airfoil extending between a cooling air inlet and a plurality of air outlets, the internal cooling passage comprising: a serpentine channel comprising a leading edge channel, an intermediate channel, a trailing edge channel, a plurality of turbulators positioned along an internal surface of a sidewall, and a plurality of leading edge turbulators positioned along a leading edge of the leading edge channel; wherein the plurality of turbulators extend from a first pull plane into the serpentine channel, and at least a portion of the plurality of leading edge turbulators extend from a second pull plane into the serpentine channel; and wherein the second pull plane is offset from the first pull plane by a compound angle comprising a first angle and a second angle.

The turbine blade of the preceding paragraph can optionally include, additionally and/or alternatively, any one or more of the following features, configurations and/or additional components:

A first section of the leading edge turbulators and a second section of leading edge turbulators, wherein the first section of leading edge turbulators extends up the leading edge of the airfoil and ends between 70% and 90% a distance from a blade base and the blade tip of the turbine blade, and wherein the second section of the leading edge turbulators extends up the leading edge of the airfoil from an end of the first section of leading edge turbulators to the blade tip of the turbine blade.

The first section of leading edge turbulators extend from the second pull plane and the second section of leading edge turbulators extend from the first pull plane, and wherein the plurality of turbulators positioned along an internal surface of a sidewall extend from the first pull plane.

The first angle is an angle between 45 degrees and 85 degrees about a vertical axis extending from the blade tip to the platform, and wherein the second angle is an angle between 20 degrees and 60 degrees downward towards the platform.

The leading edge channel is positioned adjacent the leading edge of the airfoil; the trailing edge channel is positioned adjacent the trailing edge of the airfoil; and the intermediate channel is positioned between the leading edge channel and the trailing edge channel.

The leading edge channel and the intermediate channel are separated by a first dividing wall, and wherein the trailing edge channel and the intermediate channel are separated by a second dividing wall.

A radially outer end of the second dividing wall is positioned closer to the blade tip than a radially outer end of the first dividing wall.

The plurality of leading edge turbulators have a chevron shape, and wherein a point of each of the plurality of chevron shaped leading edge turbulators points toward the platform of the turbine blade.

The following are further non-exclusive descriptions of possible embodiments of the present invention.

An internally cooled turbine blade for use in a gas turbine engine, the internally cooled turbine blade comprising: an airfoil with a concave sidewall and a convex sidewall extending spanwise between a platform and a blade tip, and chordwise between a leading edge and a trailing edge; wherein internal surfaces of the airfoil define an internal cooling passage within the airfoil extending between a cooling air inlet and a plurality of air outlets, the internal cooling passage comprising: a serpentine channel comprising a leading edge channel, an intermediate channel, a trailing edge channel, and a plurality of turbulators; and wherein the cooling air inlet comprises a first inlet, a second inlet, a third inlet, and a fourth inlet, wherein: the first inlet and the second inlet combine into a first combined inlet; the third inlet and the fourth inlet combine into a second combined inlet; the first combined inlet is in fluid communication with the leading edge channel; and the second combined inlet is in fluid communication with the trailing edge channel.

The internally cooled turbine blade of the preceding paragraph can optionally include, additionally and/or alternatively, any one or more of the following features, configurations and/or additional components:

The first inlet and the second inlet have a larger cross-sectional flow area than the third inlet and the fourth inlet; the first inlet has a larger cross-sectional flow area than the second inlet; the second inlet has a larger cross-sectional flow area than the fourth inlet; and the fourth inlet has a larger cross-sectional flow area than the third inlet.

The leading edge channel is positioned adjacent the leading edge of the airfoil; the trailing edge channel is positioned adjacent the trailing edge of the airfoil; the intermediate channel is positioned between the leading edge channel and the trailing edge channel; and the first inlet, second inlet, third inlet, and fourth inlet are in series from the leading edge to the trailing edge of the airfoil.

The leading edge channel and the intermediate channel are separated by a first dividing wall, and wherein the trailing edge channel and the intermediate channel are separated by a second dividing wall.

A radially outer end of the second dividing wall is positioned closer to the blade tip than a radially outer end of the first dividing wall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine blade for use in a gas turbine engine, the turbine blade comprising:
   an airfoil with a concave sidewall and a convex sidewall extending spanwise between a platform and a blade tip, and chordwise between a leading edge and a trailing edge;
   wherein internal surfaces of the airfoil define an internal cooling passage within the airfoil extending between a cooling air inlet and a plurality of air outlets, the internal cooling passage comprising:
      a serpentine channel comprising a leading edge channel, an intermediate channel, a trailing edge channel, a plurality of turbulators positioned along an internal surface of a sidewall, and a plurality of leading edge turbulators positioned along a leading edge of the leading edge channel;
      wherein the plurality of turbulators extend from a first pull plane into the serpentine channel, and at least a portion of the plurality of leading edge turbulators extend from a second pull plane into the serpentine channel; and
      wherein the second pull plane is offset from the first pull plane by a compound angle comprising a first angle and a second angle.

2. The turbine blade of claim 1 further comprising a first section of the leading edge turbulators and a second section of leading edge turbulators, wherein the first section of leading edge turbulators extends up the leading edge of the airfoil and ends between 70% and 90% a distance from a blade base and the blade tip of the turbine blade, and wherein the second section of the leading edge turbulators extends up the leading edge of the airfoil from an end of the first section of leading edge turbulators to the blade tip of the turbine blade.

3. The turbine blade of claim 1, wherein the first section of leading edge turbulators extend from the second pull plane and the second section of leading edge turbulators extend from the first pull plane, and wherein the plurality of turbulators positioned along an internal surface of a sidewall extend from the first pull plane.

4. The turbine blade of claim 1, wherein the first angle is an angle between 45 degrees and 85 degrees about a vertical axis extending from the blade tip to the platform, and wherein the second angle is an angle between 20 degrees and 60 degrees downward towards the platform.

5. The turbine blade of claim 1, wherein:
   the leading edge channel is positioned adjacent the leading edge of the airfoil;
   the trailing edge channel is positioned adjacent the trailing edge of the airfoil; and
   the intermediate channel is positioned between the leading edge channel and the trailing edge channel.

6. The turbine blade of claim 5, wherein the leading edge channel and the intermediate channel are separated by a first dividing wall, and wherein the trailing edge channel and the intermediate channel are separated by a second dividing wall.

7. The turbine blade of claim 6, wherein a radially outer end of the second dividing wall is positioned closer to the blade tip than a radially outer end of the first dividing wall.

8. The turbine blade of claim 1, wherein the plurality of leading edge turbulators have a chevron shape, and wherein a point of each of the plurality of chevron shaped leading edge turbulators points toward the platform of the turbine blade.

9. An internally cooled turbine blade for use in a gas turbine engine, the internally cooled turbine blade comprising:
   an airfoil with a concave sidewall and a convex sidewall extending spanwise between a platform and a blade tip, and chordwise between a leading edge and a trailing edge;
   wherein internal surfaces of the airfoil define an internal cooling passage within the airfoil extending between a cooling air inlet and a plurality of air outlets, the internal cooling passage comprising:
      a serpentine channel comprising a leading edge channel, an intermediate channel, a trailing edge channel, and a plurality of turbulators; and
   wherein the cooling air inlet comprises a first inlet, a second inlet, a third inlet, and a fourth inlet, wherein:
      the first inlet and the second inlet combine into a first combined inlet;
      the third inlet and the fourth inlet combine into a second combined inlet;
      the first combined inlet is in fluid communication with the leading edge channel; and
      the second combined inlet is in fluid communication with the trailing edge channel.

10. The internally cooled turbine blade of claim 9, wherein:
    the first inlet and the second inlet have a larger cross-sectional flow area than the third inlet and the fourth inlet;
    the first inlet has a larger cross-sectional flow area than the second inlet;
    the second inlet has a larger cross-sectional flow area than the fourth inlet; and
    the fourth inlet has a larger cross-sectional flow area than the third inlet.

11. The internally cooled turbine blade of claim 9, wherein:
    the leading edge channel is positioned adjacent the leading edge of the airfoil;
    the trailing edge channel is positioned adjacent the trailing edge of the airfoil;

the intermediate channel is positioned between the leading edge channel and the trailing edge channel; and the first inlet, second inlet, third inlet, and fourth inlet are in series from the leading edge to the trailing edge of the airfoil.

12. The internally cooled turbine blade of claim 11, wherein the leading edge channel and the intermediate channel are separated by a first dividing wall, and wherein the trailing edge channel and the intermediate channel are separated by a second dividing wall.

13. The internally cooled turbine blade of claim 12, wherein a radially outer end of the second dividing wall is positioned closer to the blade tip than a radially outer end of the first dividing wall.

* * * * *